(12) United States Patent
Lindqvist et al.

(10) Patent No.: US 12,359,145 B2
(45) Date of Patent: Jul. 15, 2025

(54) METHOD FOR TREATING LIPID MATERIALS

(71) Applicant: Neste Oyj, Espoo (FI)

(72) Inventors: Petri Lindqvist, Espoo (FI); Jarmo Halttunen, Espoo (FI); Olli Visuri, Espoo (FI); Väinö Sippola, Espoo (FI); Antti Pasanen, Espoo (FI); Sami Toppinen, Espoo (FI); Jukka-Pekka Pasanen, Espoo (FI)

(73) Assignee: NESTE OYJ, Espoo (FI)

( * ) Notice: Subject to any disclaimer, the term of this patent is extended or adjusted under 35 U.S.C. 154(b) by 748 days.

(21) Appl. No.: 17/417,307

(22) PCT Filed: Dec. 16, 2019

(86) PCT No.: PCT/EP2019/085398
§ 371 (c)(1),
(2) Date: Jun. 22, 2021

(87) PCT Pub. No.: WO2020/136034
PCT Pub. Date: Jul. 2, 2020

(65) Prior Publication Data
US 2022/0073840 A1  Mar. 10, 2022

(30) Foreign Application Priority Data

Dec. 28, 2018  (FI) ...................... 20186137

(51) Int. Cl.
*C11B 1/02* (2006.01)
*C10G 3/00* (2006.01)
(Continued)

(52) U.S. Cl.
CPC .................. *C11B 1/02* (2013.01); *C10G 3/00* (2013.01); *C11B 3/001* (2013.01); *C11B 3/008* (2013.01);
(Continued)

(58) Field of Classification Search
CPC . C11B 1/02; C11B 3/001; C11B 3/008; C11B 3/02; C11B 3/04; C11B 3/12;
(Continued)

(56) References Cited

U.S. PATENT DOCUMENTS

| | | | |
|---|---|---|---|
| 732,548 A | 6/1903 | Guillaume |
| 1,074,913 A | 10/1913 | Walter |

(Continued)

FOREIGN PATENT DOCUMENTS

| | | |
|---|---|---|
| CN | 1258224 A | 6/2000 |
| CN | 101780344 A | 7/2010 |

(Continued)

OTHER PUBLICATIONS

Notification of the First Office Action issued on Jul. 4, 2022, by the Chinese Patent Office in corresponding Chinese Patent Application No. 201980083883.8, and an English Translation of the Office Action. (13 pages).

(Continued)

*Primary Examiner* — Ali Z Fadhel
(74) *Attorney, Agent, or Firm* — Buchanan, Ingersoll & Rooney PC

(57) ABSTRACT

A method for treating a lipid material containing phosphorous and/or metal compounds is described. The method includes providing the lipid material, preheating the lipid material, to obtain a preheated lipid material, heat treating the preheated lipid material in a heat treatment step, to obtain a heat treated lipid material, and optionally post treating the heat treated lipid material in a post treatment step.

29 Claims, 2 Drawing Sheets

(51) Int. Cl.
  *C11B 3/00* (2006.01)
  *C11B 3/02* (2006.01)
  *C11B 3/04* (2006.01)
  *C11B 3/12* (2006.01)
  *C11B 3/16* (2006.01)

(52) U.S. Cl.
  CPC ............... *C11B 3/02* (2013.01); *C11B 3/04* (2013.01); *C11B 3/12* (2013.01); *C11B 3/16* (2013.01)

(58) Field of Classification Search
  CPC ..... C11B 3/16; C11B 1/00; C11B 3/00; C11B 13/00; C10G 3/00; Y02E 50/10; Y02P 30/20; C11C 1/00
  See application file for complete search history.

(56) References Cited

U.S. PATENT DOCUMENTS

| | | | |
|---|---|---|---|
| 1,502,573 A | 7/1924 | Kuhn | |
| 2,428,922 A | 10/1947 | Shoresman | |
| 2,582,523 A | 1/1952 | Beglinger | |
| RE23,677 E | 6/1953 | Bartleson | |
| 3,685,971 A | 8/1972 | Carson | |
| 3,713,991 A | 1/1973 | Thomas | |
| 3,780,076 A | 12/1973 | Papahronis et al. | |
| 3,871,969 A | 3/1975 | Chapman | |
| 4,816,191 A | 3/1989 | Berven et al. | |
| 5,906,773 A | 5/1999 | Hausch et al. | |
| 6,123,323 A | 9/2000 | Yoneda et al. | |
| 6,172,247 B1 | 1/2001 | Copeland et al. | |
| 6,172,248 B1* | 1/2001 | Copeland | C07F 9/103 554/204 |
| 6,293,526 B1 | 9/2001 | Fischer et al. | |
| 7,481,871 B2 | 1/2009 | Frye et al. | |
| 8,133,519 B2 | 3/2012 | Kellens et al. | |
| 8,882,861 B2 | 11/2014 | Cranford et al. | |
| 8,951,592 B2 | 2/2015 | Schols et al. | |
| 9,522,965 B2* | 12/2016 | Chen | C11B 1/10 |
| 9,844,738 B1 | 12/2017 | Lee et al. | |
| 10,744,422 B2 | 8/2020 | Sato et al. | |
| 2002/0158350 A1 | 10/2002 | Ender et al. | |
| 2002/0174900 A1 | 11/2002 | Fehr et al. | |
| 2006/0197239 A1 | 9/2006 | Kister et al. | |
| 2008/0034646 A1* | 2/2008 | Franzoi | C11B 3/008 554/208 |
| 2008/0271983 A1 | 11/2008 | Alzner et al. | |
| 2009/0266743 A1 | 10/2009 | Yao et al. | |
| 2011/0023353 A1* | 2/2011 | Ciciulla | C11C 3/003 44/388 |
| 2011/0259728 A1 | 10/2011 | Tamminen et al. | |
| 2012/0160453 A1 | 6/2012 | Alzner et al. | |
| 2013/0204066 A1 | 8/2013 | Chretien | |
| 2013/0239467 A1* | 9/2013 | Lu | C11C 3/003 554/21 |
| 2013/0277869 A1 | 10/2013 | Haroun et al. | |
| 2013/0287925 A1* | 10/2013 | Schols | A23D 9/04 426/601 |
| 2014/0148609 A1* | 5/2014 | Roussis | C10L 1/00 554/176 |
| 2014/0199453 A1* | 7/2014 | Deweese | C11B 13/00 210/167.28 |
| 2014/0232023 A1 | 8/2014 | Kister et al. | |
| 2014/0296495 A1 | 10/2014 | Chen et al. | |
| 2015/0291891 A1* | 10/2015 | Osawaru | C01B 3/22 585/254 |
| 2015/0353864 A1* | 12/2015 | Vermeiren | C10G 3/45 554/162 |
| 2017/0321149 A1* | 11/2017 | Lofquist | C11C 3/12 |
| 2021/0292657 A1 | 9/2021 | Toukoniitty et al. | |
| 2022/0072446 A1 | 3/2022 | Kuitunen et al. | |
| 2022/0073840 A1 | 3/2022 | Lindqvist et al. | |

FOREIGN PATENT DOCUMENTS

| | | |
|---|---|---|
| CN | 102492546 A | 6/2012 |
| CN | 202289553 U | 7/2012 |
| CN | 102965182 A | 3/2013 |
| CN | 103409232 A | 11/2013 |
| EP | 0574272 A2 | 12/1993 |
| EP | 3260180 A1 | 12/2017 |
| FI | 20135638 A | 12/2014 |
| FI | 20185650 A1 | 1/2020 |
| GB | 1510056 A | 5/1978 |
| GB | 2412664 A | 10/2005 |
| GB | 2481698 A | 1/2012 |
| KR | 20140007065 A | 1/2014 |
| WO | 2006097302 A1 | 9/2006 |
| WO | 2011041076 A1 | 4/2011 |
| WO | 2013006578 A1 | 1/2013 |
| WO | 2013063085 A1 | 5/2013 |
| WO | 2014111598 A2 | 7/2014 |
| WO | 2014111598 A3 | 10/2014 |
| WO | 2018024728 A1 | 2/2018 |
| WO | 2018060302 A1 | 4/2018 |
| WO | 2018060324 A1 | 4/2018 |
| WO | 2020016400 A1 | 1/2020 |

OTHER PUBLICATIONS

Office Action issued on Dec. 9, 2022, by the Indian Patent Office in corresponding Indian Patent Application No. 202117026604. (5 pages).
Office Action issued on Oct. 20, 2023, by the U.S. Patent and Trademark Office in U.S. Appl. No. 17/417,253.
Database WPI, 2017 Clarivate Analytics, Week 201363, AN 2013-J72693, XP002797057, Thomson Scientific, London, GB. (2 pages).
International Preliminary Report on Patentability (PCT/IPEA/409) issued in corresponding International Patent Application No. PCT/EP2019/085398 dated Mar. 11, 2021. (9 pages).
International Preliminary Report on Patentability (PCT/IPEA/409) issued in corresponding International Patent Application No. PCT/EP2019/085641 dated Apr. 12, 2021. (16 pages).
International Search Report (PCT/ISA/210) and Written Opinion (PCT/ISA/237) mailed on Jan. 31, 2020, by the European Patent Office as the International Searching Authority for International Application No. PCT/EP2019/085398. (11 pages).
International Search Report (PCT/ISA/210) and Written Opinion (PCT/ISA/237) mailed on Mar. 9, 2020, by the European Patent Office as the International Searching Authority for International Application No. PCT/EP2019/085641. (11 pages).
First Office Action issued on Dec. 29, 2023, by the Chinese Patent Office in corresponding Chinese Patent Application No. 201980083489.4, and an English Translation of the Office Action. (14 pages).
Office Action issued on Dec. 7, 2023, by the Brazilian Patent Office in corresponding Brazilian Patent Application No. BR112021011202-2. (4 pages).
Office Action issued on Mar. 13, 2024, by the Canadian Patent Office in corresponding Canadian Patent Application No. 3,122,641. (5 pages).

* cited by examiner

METHOD FOR TREATING LIPID MATERIALS

TECHNICAL FIELD

The present invention relates to a method for treating lipid materials comprising phosphorous and/or metal compounds as impurities.

BACKGROUND ART

It is a well-known fact that oils and fats can contain phospholipids and other impurities that have to be removed from the feed before catalytic processing as they are detrimental to the quality of the final product, cause plugging and inactivation of the catalyst used and fouling of equipment, such as heat exchangers. Generally, refining processes used before catalytic production of fuels or chemicals are adopted from edible oil refining, such as chemical and physical refining. However, these techniques may not be fully suitable for the most difficult oils such as animal fat, damaged rapeseed oil, used cooking oil or algal oil.

It is also a well-known fact that phospholipids are prone to thermal degradation. Especially prone to degradation are the amino group containing phosphatidylethanolamines (PE). On the other hand, phosphatidylcholines (PC) have been reported as most resistant to thermal treatment. Phosphatidylinositols (PI), phosphatidic acids (PA) and phosphatidylethanolamines (PE) have been shown to degrade almost completely in 1 hour at 174° C.

Thermal cracking of such impurities at deoxygenation temperatures has been suggested in US Patent Application US 2009/0266743, wherein temperatures of up to 540° C. are used.

GB 1470022 relates to purification of used lubricating oils, e.g. from motor car engines, gear-boxes and differentials, containing metal compounds by heating to 200-500° C., cooling and then filtering through a semi-permeable membrane having a cut zone in the range 5000-300,000 and being permeable to the oil but not substantially permeable to the impurities to be removed. The heating can be carried out in the presence of water, steam and/or slaked lime.

WO2018/060302 relates to a method for purification of lipid material, wherein the amount of phosphorous and/or metal compounds in the lipid material is reduced by heat treatment at a temperature of about 240° C. to about 280° C. without water or other solvent.

There is a need for alternative methods for treating lipid material, which methods provide an effective reduction of phosphorous and/or metal compounds without being harmful to the quality of the final product.

SUMMARY OF THE INVENTION

It is an object of certain aspects of the present invention to provide an improvement over the above described techniques and known art; particularly to provide a method for treating a lipid material comprising phosphorous and/or metal compounds.

Thus, one object of the present invention is to provide a method for treating a lipid material comprising phosphorous and/or metal compounds, the method comprising
a) providing the lipid material,
b) preheating the lipid material, to obtain a preheated lipid material,
c) heat treating the preheated lipid material in a heat treatment step, to obtain a heat treated lipid material,
d) optionally post treating the heat treated lipid material in a post treatment step.

In one embodiment, the preheating step b) is conducted at a temperature of about 90° C. to about 160° C.

In a preferred embodiment the heat treating step c) is conducted at a temperature of about 220° C. to about 300° C., preferably about 220° C. to about 280° C., more preferably about 260° C. to about 280° C.

In another preferred embodiment the heat treating step c) is conducted at a pressure of about 0 bar (g) to about 20 bar (g), preferably about 1 bar (g) to about 10 bar (g), more preferably about 1 bar (g) to about 3 bar (g).

In a further embodiment the heat treating step c) is conducted during a time of about 5 to about 300 minutes, preferably about 10 to about 180 minutes, more preferably about 15 to about 90 minutes, even more preferably about 30 to about 60 minutes.

In one embodiment the moisture content of the lipid material during the heat treatment is about 200 to about 2500 mg/kg, preferably about 200 to about 1500 mg/kg, more preferably about 200 mg/kg to about 1000 mg/kg.

In a further embodiment of the present invention, the lipid material is renewable lipid material.

In a preferred embodiment, the lipid material is a plant based, a microbial based or an animal based lipid material, or any combination thereof.

In one embodiment of the present invention, the preheating step b) further comprises an air removal step.

Preferably, the phosphorous compounds are phospholipids selected from a group comprising phosphatidyl ethanolamines, phosphatidyl cholines, phosphatidyl inositols and phosphatidic acids.

In one embodiment, the post treating step d) comprises addition of moisture to the lipid material.

In a further embodiment, the heat treating step c) takes place in at least one reactor.

In a preferred embodiment, the at least one reactor is selected from tube reactor and/or stirred tank reactor.

In one embodiment of the present invention, at least a portion, such as e.g. 1 to 99 wt %, 5 to 95 wt %, 10 to 90 wt %, 20 to 80 wt %, 30 to 70 wt %, 40 to 60 wt %, of the lipid material that has been subject to the heat treating step c) is withdrawn, heated to a temperature of about 300° C. to about 350° C. and reintroduced into step c) where the lipid material is being subject to the heat treating step c).

In another embodiment, the post treating step d) comprises cooling, settling, filtration, centrifugation and/or bleaching.

In a preferred embodiment, the post treating step d) is bleaching.

In a further embodiment, the lipid material provided in step a) comprises about 30 to about 2000 mg/kg phosphorous, preferably about 30 to about 1000 mg/kg phosphorous, more preferably about 50 mg/kg to about 600 mg/kg phosphorous.

In one embodiment, the method further comprises hydrotreatment of the heat treated lipid material in the presence of a hydrotreatment catalyst in order to obtain a hydrotreated lipid material.

In a preferred embodiment, the hydrotreatment may be selected from hydrodeoxygenation (HDO), hydrodesulfurisation (HDS), hydrodemetallization (HDM), hydrodenitrification (HDN) and/or hydrodearomatisation (HDA).

In one embodiment of the present invention, the method further comprises a second heat treatment after the heat treating step c).

A further object of the present invention is to provide a method for producing hydrocarbons, comprising
   x) treating a lipid material comprising phosphorous and/or metal compounds, using a method as specified above, and
   y) subjecting the lipid material from step x) to an oil refinery conversion process.

In one embodiment, the oil refinery conversion process comprises altering the molecular weight of the lipid material, removal of heteroatoms from the lipid material, altering the degree of saturation of the lipid material, rearranging the molecular structure of the lipid material, or any combination thereof, to obtain at least one hydrocarbon.

In a further embodiment, step y) comprises hydrocracking.

In another embodiment, step y) comprises steam cracking.

According to a further embodiment, step y) comprises isomerization.

In one embodiment, step y) comprises thermal catalytic cracking.

In another embodiment, step y) comprises fluid catalytic cracking.

BRIEF DESCRIPTION OF THE DRAWINGS

These and other aspects, features and advantages of which embodiments of the invention are capable of, will be apparent and elucidated from the following description of embodiments and aspects of the present invention, reference being made to the accompanying drawings, in which.

DETAILED DESCRIPTION OF THE INVENTION

Figure 1:
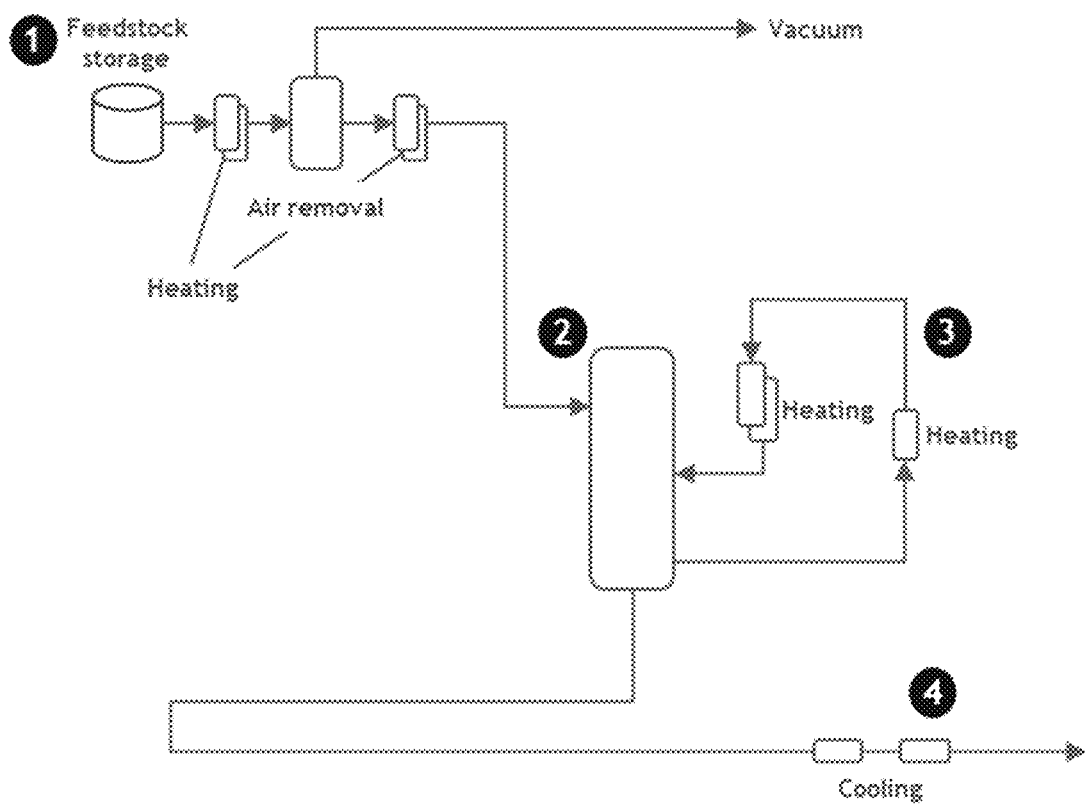
FIG. 1 illustrates a simplified description of a process described according to the present invention, where 1) lipid material, that could have been processed prior to preheating and heat treatment, for example by settling, filtration, centrifugation, etc., is preheated to a temperature of about 90 to about 160° C. This preheating step may also comprise an air removal step in order to minimize oxidation reactions. 2) The preheated crude lipid material is introduced to a heat treatment reactor for a heat treatment step, which reactor is designed so that a desired reaction residence time is achieved. 3) Part of the lipid material that has been subject to the heat treatment is withdrawn and heated to a higher temperature than the temperature of the heat treatment, and is used to heat the incoming preheated lipid material to the desired heat treatment reaction temperature. 4) Lipid material that has been subject to the heat treatment is then taken out of the reactor and cooled before further steps, such as bleaching. By such a process the fouling takes place outside the heat exchangers, reducing the need for washing and thereby reducing costs and waste. The fouling takes place inside the reactor to surfaces which are not used to transfer heat, and the cleaning thereof thus has to be conducted more seldom.

Specific embodiments of the invention will now be described with reference to the accompanying drawings.

The different aspects, alternatives and embodiments of the invention disclosed herein can be combined with one or more of the other aspects, alternatives and embodiments described herein. Two or more aspects can be combined.

In describing the embodiments of the invention specific terminology will be resorted to for the sake of clarity. However, the invention is not intended to be limited to the specific terms so selected, and it is understood that each specific term includes all technical equivalents which operate in a similar manner to accomplish a similar purpose.

When describing the embodiments of the present invention, the combinations and permutations of all possible embodiments have not been explicitly described. Nevertheless, the mere fact that certain measures are recited in mutually different dependent claims or described in different embodiments does not indicate that a combination of these measures cannot be used to advantage. The present invention envisages all possible combinations and permutations of the described embodiments.

The terms "comprising", "comprise" and "comprises" herein are intended by the inventors to be optionally substitutable with the terms "consisting of", "consist of" and "consists of", respectively, in every instance.

As used herein, the singular forms "a", "an" and "the" are intended to include the plural forms as well, unless the context clearly indicates otherwise.

As mentioned above, the present invention relates to a method for treating a lipid material comprising phosphorous and/or metal compounds. The content of phosphorous and/or metal compounds in lipid material used in e.g. steam cracking and processes for production of renewable fuel, such as renewable diesel fuel, is a large problem. The phosphorous and/or metal compounds are harmful to the quality of the final product. Phosphorous compounds can deactivate catalysts used to convert renewable feeds to transport fuels and chemicals.

Further, the phosphorous and/or metal compounds cause fouling on equipment, such as heat exchangers. Thus, the equipment requires cleaning, causing maintenance costs and costs for interrupted production. Further, the amount of waste streams is increased due to the cleaning requirements.

The lipid material to be treated may contain impurities containing metals and phosphorus in the form of phospholipids, soaps or salts. Metal impurities that may be present in the lipid material may be e.g. alkali metals or alkali earth metals, such as sodium or potassium salts or magnesium or calcium salts or any compounds of said metals.

The phosphorous compounds present in the lipid material according to the present invention may be phospholipids. The phospholipids present in the lipid material may be one or more of phosphatidyl ethanolamines, phosphadityl cholines, phosphatidyl inositols, phosphatidic acids, and phosphatidyl ethanolamines.

The fouling during heat treatment of lipid material is caused by thermal disruption of the phosphorous and/or metal compounds, especially phospholipids form solid metal phosphates and metal pyrophosphates during heat treatment.

It has previously been found that thermal processing of a lipid material in combination with bleaching leads to a more effective reduction of phosphorous and metal contents than bleaching alone. Such a thermal processing, called heat treatment, requires that the lipid material, comprising the impurities, is heated to a temperature of about 220-300° C., preferably about 220-280° C., more preferably about 260-280° C., for a time period long enough to reduce the content of impurities. In oleochemical and edible oil industries, the feed comprising impurities typically is not heated to temperatures above about 100° C., since that would result in deterioration of the quality of the feed and fouling of surfaces.

The term "lipid material" refers to fats and/or oils of plant, microbial and/or animal origin. It also refers to any waste stream received from processing of such oils and/or fats. Generally, fats are solid at room temperature and oils are liquid at room temperature.

Examples of lipid material of the present invention include, but are not limited to, tall oil, the residual bottom fraction from tall oil distillation processes, animal based oils and fats, vegetable or plant based oils and fats such as sludge palm oil, used cooking oil, microbial oils, algae oils, free fatty acids, any lipids containing phosphorous and/or metals, oils originating from yeast or mold products, oils originating from biomass, rapeseed oil, canola oil, colza oil, sunflower oil, soybean oil, hemp oil, olive oil, linseed oil, cottonseed oil, mustard oil, palm oil, *arachis* oil, castor oil, coconut oil, animal fats such as suet, tallow, blubber, recycled alimentary fats, starting materials produced by genetic engineering, and biological starting materials produced by microbes such as algae and bacteria and any mixtures of said feedstocks.

In particular, the lipid material is animal fats and/or used cooking oil. It is to be understood that used cooking oil may comprise one or more of the above mentioned oils, such as e.g. rapeseed oil, canola oil, colza oil, sunflower oil, soybean oil, hemp oil, olive oil, linseed oil, cottonseed oil, mustard oil, palm oil, *arachis* oil, castor oil, coconut oil, and animal fat.

The lipid material to be treated according to the present method typically contains impurities comprising phosphorous and/or metals in the form of phospholipids, soaps and/or salts. The impurities may for example be in the form of phosphates or sulfates, iron salts or organic salts, soaps or phospholipids. The metal impurities that may be present in the lipid material are for example alkali metals or alkali earth metals, such as sodium or potassium salts, or magnesium or calcium salts, or any compounds of said metals.

The lipid material to be treated in a method according to the present invention may have been pre-processed before the preheating and heat treatment through different steps, including, but not limited to, settling, degumming, bleaching, deodorizing and/or distillation.

The lipid material, provided before the preheating and heat treatment, preferably comprises phosphorous at an amount of about 30-2000 mg/kg, more preferably about 30-1000 mg/kg, even more preferably about 50-600 mg/kg lipid material.

Lipid material that has been treated according to the method of present invention may be further processed by e.g. catalytic processes. Such processes may be e.g. catalytic cracking, thermo-catalytic cracking, catalytic hydrotreatment, fluid catalytic cracking, catalytic ketonization, catalytic esterification, or catalytic dehydration. Such processes require the lipid material to be sufficiently pure and freed from impurities that may otherwise hamper the catalytic process or poison the catalyst present in the process.

An embodiment of the invention is shown in FIG. 1, which illustrates a simplified description of a method according to the present invention.

At step 1) a lipid material, that could have been processed prior to preheating and heat treatment, is preheated to a temperature of about 90° C. to about 160° C.

Specifically, the temperature that the lipid material is preheated to may be e.g. about 100° C. to about 150° C., such as e.g. about 110° C. to about 140° C., such as e.g. about 120° C. to about 130° C., or about 90° C., about 100° C., about 110° C., about 120° C., about 130° C., about 140° C., about 150° C., about 160° C.

The preheating step may also involve an air removal step in which the soluble oxygen of the lipid material can be removed in order to minimize oxidation reactions that take place during the heat treatment (step 2). This may be conducted by applying vacuum. Before, during or after the preheating step, the moisture content of the lipid material can be controlled by addition of moisture in the form of water and/or steam to the lipid material, prior to the heat treatment.

At step 2) the preheated lipid material is thereafter introduced to a heat treatment reactor for a heat treatment, where the reactor is designed so that a desired reaction residence time is achieved and that fouling has surface to take place. The heat treatment is conducted at a pressure of about 0 bar (g) to about 20 bar (g), preferably at a pressure of about 1 bar (g) to about 10 bar (g), most preferably at a pressure of about 1 bar (g) to about 3 bar (g). The temperature of the heat treatment is preferably a temperature of about 220° C. to about 300° C., more preferably at a temperature of about 220° C. to about 280° C., most preferably at a temperature of about 260° C. to about 280° C.

Specifically, the temperature of the heat treatment may be e.g. about 230° C. to about 290° C., such as e.g. about 240° C. to about 280° C., such as e.g. about 250° C. to about 270° C., or about 220° C., about 230° C., about 240° C., about 250° C., about 260° C., about 270° C., about 280° C., about 290° C., about 300° C.

The reaction time of the heat treatment step is preferably about 5 minutes to about 300 minutes, preferably about 10 to about 180 minutes, more preferably about 15 to about 90 minutes, even more preferably about 30 minutes to about 60 minutes.

Specifically the reaction time may be e.g. about 15 to about 290 minutes, such as e.g. about 25 minutes to about 280 minutes, such as e.g. about 35 minutes to about 270 minutes, such as e.g. about 45 minutes to about 260 minutes, such as e.g. about 55 minutes to about 250 minutes, such as e.g. about 65 minutes to about 240 minutes, such as e.g. about 75 minutes to about 230 minutes, such as e.g. about 85 minutes to about 220 minutes, such as e.g. about 95 minutes to about 210 minutes, such as e.g. about 105 minutes to about 200 minutes, such as e.g. about 115 minutes to about 190 minutes, such as e.g. about 125 minutes to about 180 minutes, such as e.g. about 135 minutes to about 170 minutes, such as e.g. about 145 minutes to about 160 minutes, or about 5 minutes, about 10 minutes, about 15 minutes, about 20 minutes, about 25 minutes, about 30 minutes, about 35 minutes, about 40 minutes, about 45 minutes, about 50 minutes, about 55 minutes, about 60 minutes, about 65 minutes, about 70 minutes, about 75 minutes, about 80 minutes, about 85 minutes, about 90 minutes, about 95 minutes, about 100 minutes, about 105 minutes, about 110 minutes, about 115 minutes, about 120 minutes, about 125 minutes, about 130 minutes, about 135 minutes, about 140 minutes, about 145 minutes, about 150 minutes, about 155 minutes, about 160 minutes, about 165 minutes, about 170 minutes, about 175 minutes, about 180 minutes, about 185 minutes, about 190 minutes, about 195 minutes, about 200 minutes, about 205 minutes, about 210 minutes, about 215 minutes, about 220 minutes, about 225 minutes, about 230 minutes, about 235 minutes, about 240 minutes, about 245 minutes, about 250 minutes, about 255 minutes, about 260 minutes, about 265 minutes, about 270 minutes, about 275 minutes, about 280 minutes, about 285 minutes, about 290 minutes, about 295 minutes, about 300 minutes.

It is to be understood that wherever it is stated in the present application that e.g. heating takes place during a certain amount of time, this means that the specified period of time commences once the specified temperature is achieved.

The moisture content of the lipid material during the heat treatment is preferably kept at a level of about 200 to about 2500 mg/kg, more preferably about 200 to about 1500 mg/kg, most preferably about 200 mg/kg to about 1000 mg/kg.

Specifically the moisture content of the lipid material during the heat treatment may be about 200 mg/kg, about 300 mg/kg, about 400 mg/kg, about 500 mg/kg, about 600 mg/kg, about 700 mg/kg, about 800 mg/kg, about 900 mg/kg, about 1000 mg/kg, about 1100 mg/kg, about 1200 mg/kg, about 1300 mg/kg, about 1400 mg/kg, about 1500 mg/kg, about 1600 mg/kg, about 1700 mg/kg, about 1800 mg/kg, about 1900 mg/kg, about 2000 mg/kg, about 2100 mg/kg, about 2200 mg/kg, about 2300 mg/kg, about 2400 mg/kg, about 2500 mg/kg.

Additionally, addition of chemicals to improve the removal of phosphorous during the heat treatment is possible. Such chemicals can comprise, but are not restricted to, acids such as sulphuric acid and/or phosphorous acid, and/or bases such as sodium hydroxide.

Step 3) shows how part of the lipid material that has been subject to the heat treatment is withdrawn and heated to a higher temperature than the temperature of the heat treatment, and thereafter used to heat the incoming lipid material from the preheating step by mixing the withdrawn lipid material from the heat treatment that has been further heated with the lipid material after the preheating step.

The withdrawn lipid material from the heat treatment is preferably heated to a temperature of about 300° C. to about 350° C., e.g. about 300° C., about 310° C., about 320° C., about 330° C. about 340° C., or about 350° C.

The heat treatment may be conducted in different reactor types, including, but not limited to, tube reactors and/or stirred tank reactors.

Step 4) illustrates that lipid material that has been subject to the heat treatment is withdrawn from the reactor and cooled before further steps, such as bleaching. The purpose of the bleaching step is to further remove soluble phosphorous and/or metal compounds and/or solids or part of solids created during the heat treatment step.

Impurities may optionally be completely or partially removed by techniques such as, but not limited to, settling, centrifugation and/or filtration.

Figure 2:
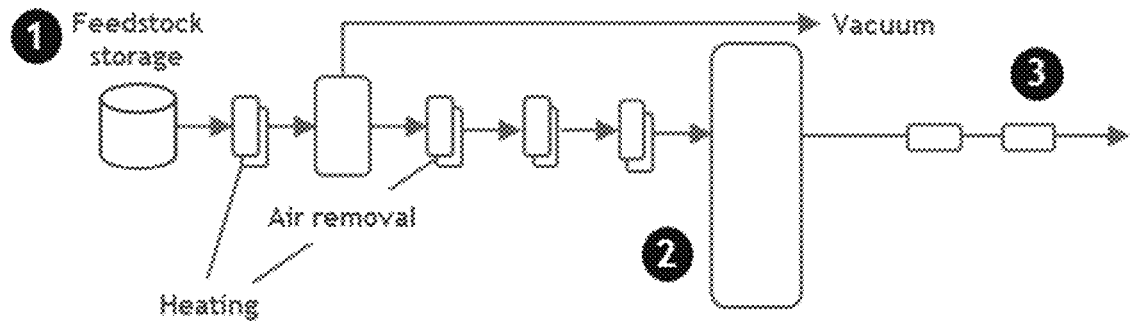
FIG. 2 illustrates an alternate process, whose fouling issues are solved by a process according to the present invention. In a process as illustrated in FIG. 2, the fouling takes place inside the heat exchangers. Such a fouling is handled in two ways: either by doubling the amount of heat exchangers, or by washing the fouled heat exchangers using steam or for example sodium hydroxide solution. In a process as illustrated by FIG. 2, in step 1) lipid material, that could have been processed prior to heat treatment, is heated to the final heat treatment reaction temperature before entering the heat treatment reactor. Before the heating is a step of air removal in order to minimize oxidation reactions. 2) The heat treatment reactor is designed so that the desired reaction residence time is achieved. 3) Heat treated lipid material is then taken out of the reactor and cooled before further steps, such as e.g. bleaching.

FIG. 2 shows an optional process, whose fouling issues are solved by the method according to the present invention. As described above, a process as illustrated in FIG. 2 results in that fouling takes place inside the heat exchangers, which fouling is handled in two ways: either by doubling the amount of heat exchangers, or by washing the fouled heat exchangers using steam or for example sodium hydroxide solution.

At step 1) a lipid material, that could have been processed prior to heat treatment, is heated to the heat treatment temperature before entering the heat treatment reactor, i.e. the lipid material is heated to a temperature of about 200° C. to about 300° C. prior to entering the heat treatment. An air removal step may be included to minimize oxidation reactions. The reactor of the heat treatment is designed so that a desired reaction residence time is achieved.

Step 3) illustrates that lipid material that has been subject to the heat treatment is withdrawn from the reactor and cooled before further steps, such as bleaching.

Thus, the reason for performing the preheating step according to the method as illustrated in FIG. 1, in accordance with the present invention, is to reduce the fouling of the heat exchangers and thus the need for cleaning procedures, resulting in reduced costs for cleaning/maintenance costs and reduced costs for interrupted production. The amount of waste streams is also reduced. When comparing, it was seen that lipid material that was subject to a preheating step in accordance with the present invention did not foul the surfaces of the heat exchangers as fast as a lipid material processed in accordance to the method as described in FIG. 2.

It is known that heat treatment reactions, i.e., solidification of the soluble impurities, require residence time to yield a high conversion, though it is also seen that when crude, impurities containing oil is heated to high temperatures (e.g. above 160° C.) for the first time, the fouling is rapid even though the residence time in the heat exchanger is low. Instead heating of once preheated material, even when the conversion of soluble impurities to insoluble impurities is not complete, at temperatures in accordance with the present invention does not lead to rapid fouling and this explains the benefit of the method according to the present invention, as exemplified in FIG. 1. Thus, the method according to the present invention may be used to control the fouling of the heat exchangers during heat treatment of a lipid material.

The method for treating a lipid material according to the present invention may further comprise a step of hydrotreatment of the heat treated lipid material in the presence of a hydrotreatment catalyst in order to obtain a hydrotreated lipid material.

Hydrotreatment may be selected from HDO, HDS, HDM, HDN and/or HDA.

The term "hydrodeoxygenation (HDO)" refers to removal of oxygen as water by the means of molecular hydrogen under the influence of a (HDO) catalyst.

The term "hydrodesulfurisation (HDS)" refers to removal of sulfur as hydrogensulfide by the means of molecular hydrogen under the influence of a (HDS) catalyst.

The term "hydrodemetallization (HDM)" refers to removal of metals by trapping them with a (HDM) catalyst.

The term "hydrodenitrification (HDN)" refers to removal of nitrogen by the means of molecular hydrogen under the influence of a (HDN) catalyst.

The term "hydrodearomatisation (HDA)" refers to saturation or ring opening of aromatics by the means of molecular hydrogen under the influence of a (HDA) catalyst.

An aspect of the present invention relates to a method for producing hydrocarbons. The method comprises reducing the amount of phosphorous and/or metal compounds in a lipid material, obtained using a method according to the present invention, and subjecting the purified lipid material to an oil refinery conversion process.

In one embodiment, the oil refinery conversion process comprises altering the molecular weight of the lipid material, removal of heteroatoms from the lipid material, altering the degree of saturation from the lipid material, rearranging the molecular structure of the lipid material, or any combination thereof, to obtain at least one hydrocarbon.

The oil refinery conversion process may comprise hydrocracking, steam cracking, isomerization, thermal catalytic cracking and/or fluid catalytic cracking.

EXAMPLES

The following example is provided to better illustrate the claimed invention and is not to be interpreted as limiting the scope of the invention. To the extent that specific materials are mentioned, it is merely for purposes of illustration and not intended to limit the invention.

One skilled in the art may develop equivalent means or reactants without the exercise of inventive capacity and without departing from the scope of the invention. It will be understood that many variations can be made in the procedures described herein while still remaining within the bounds of the present invention. It is the intention of the inventors that such variations be included within the scope of the invention.

Example 1: Effect of the Method of the Present Invention on Fouling

The fouling experiments were performed in a lab-scale fouling testing equipment, Falex Thermal Fouling Tester. In the fouling testing equipment, the tested material was pumped (1 ml/min) from a feed reservoir (500 grams of test material, 90° C., 15 bar nitrogen pressure) to a pipe that has an electrically heated rod inside the pipe. When the test material had passed through the pipe, it was returned to the feed reservoir. The test time was 18 hours (full content of the feed reservoir passed through the equipment in 8 h 20 min).

As the test material passes through the pipe, the temperature of the test material increases to the temperature level of the heated rod. As the test material starts to cause fouling on the surface of the heated rod, the temperature difference between the rod, whose temperature is kept constant, and the test material out of the pipe, increases. The higher the temperature difference between the rod and the test material, the higher the fouling tendency.

In the experiment, the original lipid material was animal fat from Europe. The lipid material was not subject to any pretreatment. The lipid material was used in the fouling tests as is, and also after lab-scale heat treatment. The heat treatment was performed in 1L Parr-reactor by heating the lipid material to 280° C. and keeping the lipid material at that temperature for a time of 60 min. The pressure was not controlled during the batch heat treatment and the pressure was let to rise. After the heat treatment, two samples were created: heat treated material as is (containing solids created during the heat treatment) and heat treated material after filtration (2 μm). The test matrix is presented in Table 1.

TABLE 1

Test matrix of the fouling experiment set.

| Sample name | Sample number | Phosphorous content mg/kg | Rod temperature in fouling testing equipment ° C. | Experiment number |
|---|---|---|---|---|
| AF from feed tank 103 – crude | 14372799 | 75 | 330 | R147 |
| AF from feed tank 103 – after lab-scale heattreatment | 14376397 | 75 | 330 | R146 |
| AF from feed tank 103 – after heat treatment + filtrered (2 μm) | 14376534 | 37 | 330 | R145 |

Figure 3:
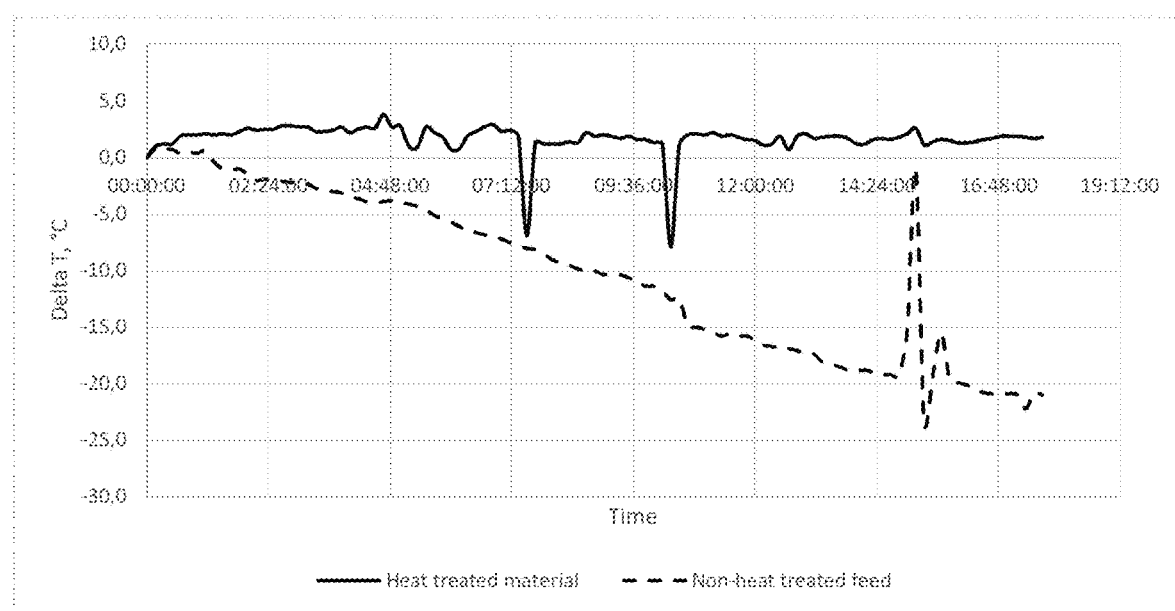
FIG. 3 illustrates fouling of a heating rod in a lab scale equipment, where a heated rod is used to heat the test material. The temperature of the test material passing through a pipe increases to the level of the heated rod. As the test material starts to cause fouling on the heated rod, the temperature difference between the rod and the test material out of the pipe increases.

The results of the experimental run with the crude lipid material and the lipid material after a method involving a preheating step of the lipid material according to the present invention, produced in lab-scale, are presented in FIG. 3 and indicate that a lipid material subject to a preheating step in accordance with the present invention, produced in lab-scale, lead to a lower fouling than a crude lipid material at 330° C., which lipid material has not been subject to a preheating step in accordance with the present invention.

The invention claimed is:

1. A method for treating a lipid material containing phosphorous and/or metal compounds, the method comprising:
   a) providing the lipid material comprising animal fats and/or used cooking oil;
   b) preheating the lipid material, to obtain a preheated lipid material;
   c) heat treating the preheated lipid material in a heat treatment step, to obtain a heat treated lipid material;
   d) optionally post treating the heat treated lipid material in a post treatment step;
   wherein the preheating step b) is conducted at a temperature of about 90° C. to about 160° C., the heat treating step c) is conducted at a temperature of about 220° C. to about 300° C., and wherein the heat treating step c) is conducted at a pressure of about 0 bar (g) to about 20 bar (g).

2. The method according to claim 1 wherein the heat treating step c) is conducted during a time of about 5 to about 300 minutes.

3. The method according to claim 1, wherein a moisture content of the lipid material during the heat treatment is about 200 to about 2500 mg/kg.

4. The method according to claim 1, wherein the lipid material is renewable lipid material.

5. The method according to claim 1, wherein the preheating of the lipid material is performed under vacuum.

6. The method according to claim 1, wherein the preheating step b) comprises:
   an air removal step.

7. The method according to claim 1, wherein phosphorous compounds are phospholipids selected from a group consisting of phosphatidyl ethanolamines, phosphatidyl cholines, phosphatidyl inositols and phosphatidic acids.

8. The method according to claim 1, wherein the post treating step d) comprises:
   adding of moisture to the lipid material.

9. The method according claim 1, wherein the heat treating step c) takes place in at least one reactor.

10. The method according to claim 1, wherein the at least one reactor is selected from tube reactor and/or stirred tank reactor.

11. The method according to claim 1, wherein a portion of the lipid material that has been subject to the heat treating step c) is withdrawn, heated to a temperature of about 300° C. to about 350° C. and reintroduced into step c) where the lipid material is being subject to the heat treating step c).

12. The method according to claim 1, wherein the post treating step d) is performed and the post treating step d) comprises:
cooling, settling, filtration, centrifugation and/or bleaching.

13. The method according claim 1, wherein the post treating step d) is performed and the post treating step d) is bleaching.

14. The method according to claim 1, wherein the lipid material provided in step a) contains about 30 to about 2000 mg/kg phosphorous.

15. The method according to claim 1, comprising:
hydrotreatment of the heat treated lipid material in a presence of a hydrotreatment catalyst in order to obtain a hydrotreated lipid material.

16. The method according to claim 15, wherein the hydrotreatment is selected from hydrodeoxygenation (HDO), hydrodesulfurisation (HDS), hydrodemetallization (HDM), hydrodenitrification (HDN) and/or hydrodearomatisation (HDA).

17. The method according claim 1, comprising:
a second heat treatment after the heat treating step c).

18. The method according to claim 1, comprising:
a step a1) for processing lipid material by settling, filtration, centrifugation prior to the preheating step b).

19. A method according to claim 1, wherein the preheating step b) is conducted at a temperature of about 90° C. to about 160° C., the heat treating step c) is conducted at a temperature of about 260° C. to about 380° C., and wherein the heat treating step c) is conducted at a pressure of about 1 bar (g) to about 3 bar (g).

20. The method according to claim 1 wherein the heat treating step c) is conducted during a time of about 30 to about 60 minutes.

21. The method according to claim 1, wherein a moisture content of the lipid material during the heat treatment is about 200 to about 1500 mg/kg.

22. The method according to claim 1, wherein the lipid material provided in step a) contains about 50 mg/kg to about 600 mg/kg phosphorous.

23. A method for producing hydrocarbons, comprising:
x) treating a lipid material containing phosphorous and/or metal compounds, using a method as claimed in claim 1, and
y) subjecting the lipid material from step x) to an oil refinery conversion process.

24. A method as claimed in claim 23, wherein the oil refinery conversion process comprises:
altering a molecular weight of the lipid material, removal of heteroatoms from the lipid material, altering a degree of saturation of the lipid material, rearranging the molecular structure of the lipid material, or any combination thereof, to obtain at least one hydrocarbon.

25. A method as claimed in claim 23, wherein step y) comprises:
hydrocracking.

26. A method as claimed in claim 23, wherein step y) comprises:
steam cracking.

27. A method as claimed in claim 23, wherein step y) comprises:
isomerization.

28. A method as claimed in claim 23, wherein step y) comprises:
thermal catalytic cracking.

29. A method as claimed in claim 23, wherein step y) comprises:
fluid catalytic cracking.

* * * * *